United States Patent

[11] 3,551,745

| [72] | Inventor | John F. Nicholas<br>Liverpool, N.Y. |
|---|---|---|
| [21] | Appl. No. | 743,167 |
| [22] | Filed | July 8, 1968 |
| [45] | Patented | Dec. 29, 1970 |
| [73] | Assignee | the United States of America as represented by the Secretary of the Army. by mesne assignments |

[54] SHUNT REGULATOR OVERVOLTAGE TRIP
5 Claims, 1 Drawing Fig.

[52] U.S. Cl..................................................... 317/16,
317/31, 317/33, 317/49
[51] Int. Cl.................................................. H02h 3/20
[50] Field of Search........................................ 323/Series
& Shint 22SCR, TERMATREX; 317/33VR, 16,
31, 33, 49; 320/SCR, 39

[56] References Cited
UNITED STATES PATENTS

| 3,163,814 | 12/1964 | Todd............................ | 323/9X |
| 3,192,441 | 5/1965 | Wright......................... | 317/33 |
| 3,359,434 | 12/1967 | Galluzzi....................... | 317/16X |
| 3,449,634 | 6/1969 | Han-Min Hung............. | 317/16X |

Primary Examiner—J. D. Miller
Assistant Examiner—Harvey Fendelman
Attorneys—Harry M. Saragovitz, Edward J. Kelly, Herbert Berl and Aubrey J. Dunn ABSTRACT: A device wherein a silicon controlled rectifier connected across a regulator output is turned on to short the regulator output when the regulator output voltage exceeds a nominal level. The gate current to key the silicon controlled rectifier into operation is supplied by a circuit in which a transistor compares the regulator output voltage with a fixed bias voltage.

PATENTED DEC 29 1970
3,551,745
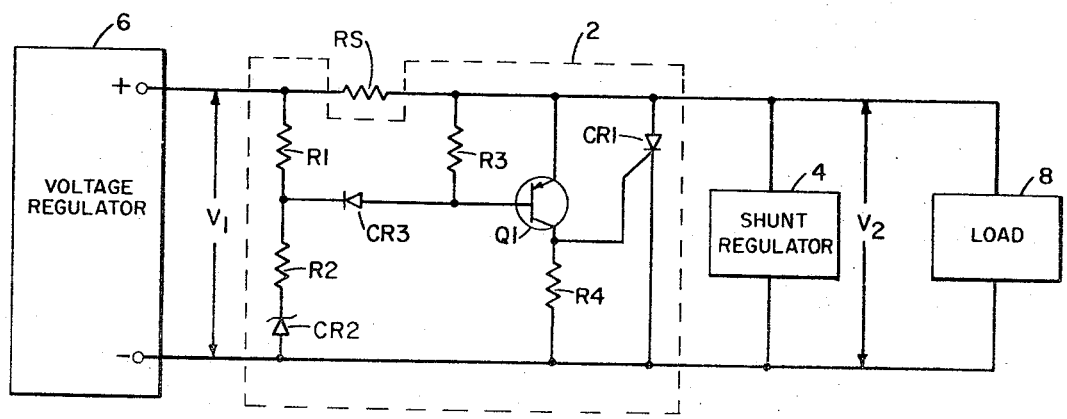
John F. Nicholas,
INVENTOR.
BY Harry M. Saragovitz
Edward J. Kelly
Herbert Berl
Aubrey J. Dunn

SHUNT REGULATOR OVERVOLTAGE TRIP

SUMMARY OF THE INVENTION

The purpose of this invention is to short the output of a shunt regulator when a malfunction or component failure occurs which would cause the regulator output to soar to a value greater than the nominal regulated level. If the voltage exceeds the nominal value, damage may occur to the components of the circuit supplied by the shunt regulator. Also, system monitors are more able to detect the results of zero voltage at the regulator output than they are an undetermined amount of overvoltage.

This invention is essentially a silicon controlled rectifier connected across the regulator output. The silicon controlled rectifier gate is connected to a transistor which cam compares the regulator output voltage with a fixed bias voltage. An overvoltage from the regulator output causes the transistor to fire the silicon controlled rectifier and short the shunt regulator output. The silicon controlled rectifier can be reset by removing the regulator supply voltage.

BRIEF DESCRIPTION OF THE DRAWING

The single FIG. drawing is a schematic diagram of the invention.

DESCRIPTION OF THE PREFERRED EMBODIMENT

The shunt regulator over-voltage trip 2 is for a positive voltage regulator. In the normal operating state, transistor Q1 and silicon controlled rectifier CR1 are not conducting. When an abnormal condition causes the regulated output voltage, V1, to increase, Q1 will turn on. Q1 turns on when its emitter potential exceeds that of its base. The resulting increased voltage across R4 turns on the gate of SCR CR1 which shorts out the regulator. The shunt regulator series dropping resistor RS is chosen with adequate dissipation for an over-voltage condition. Resistors R1, R2, R3, and zener diode CR2 comprise the bias circuit for the base of transistor Q1. The output voltage V2 of the shunt regulator 4 is applied to load 8. If voltage V2 exceeds a predetermined value, the reverse bias voltage across diode CR3 will be removed, and then the forward drop across diode CR3 and the emitter to base junction of Q1 will be overcome. Transistor Q1 will then be turned on.

Since the output voltage V1 of voltage regulator 6 is a regulated source, CR2 would not be necessary to establish the Q1 base bias. However, when the positive voltage is initially turned on, the high impedance of CR2 at voltages below the zener voltage allows the base of Q1 to reach maximum voltage before the emitter. Thus, the SCR is not turned on by transients. The wiring of the positive voltage to the shunt regulator over-voltage trip board and then back to RS also insures the biasing of the base of Q1 before the emitter of Q1 receives maximum voltage.

The voltage regulator 6 can also be replaced by an unregulated source if R2 is eliminated and CR2 arranged to provide the desired bias voltage either by selection of the correct zener diode or series combination of zener diodes.

While the invention has been described with reference to a preferred embodiment thereof, it will be apparent that various modifications and other embodiments thereof will occur to those skilled in the art within the scope of the invention. As an example, the present invention could be used to regulate a negative voltage instead of a positive voltage as described herein by simply rearrangement of the circuit components according to the teaching of the present invention. Accordingly, I desire the scope of my invention to be limited only by the appended claims.

I claim:

1. An overvoltage trip circuit connected between a voltage regulator and a shunt regulator, said overvoltage trip circuit comprising: a means for sensing the voltage of said voltage regulator and said shunt regulator; a transistor responsive to said voltage sensing men means; and switching means responsive to said transistor for shorting said shunt regulator; said shunt regulator having a series resistor connected in the positive voltage lead of said voltage regulator and in series with said voltage regulator and said shunt regulator and wherein said means for sensing the voltage of said voltage regulator and said shunt regulator comprises: a first and second resistor connected in shunt with said voltage regulator, said first resistor being connected to a first end of said series resistor; and third resistor; a first diode, the cathode of said first diode being connected between said first and second resistor; said third resistor being connected to a second end of said series resistor, the anode of said diode and the base of said transistor, whereby said transistor is caused to conduct when an overvoltage condition exists.

2. An overvoltage trip circuit as set forth in claim 1 further comprising a fourth resistor said fourth resistor being connected between the negative voltage lead of said voltage regulator, the collector of said transitor, and said switching means; the emitter of said transistor being connected to second end of said series resistor.

3. An overvoltage trip circuit as set forth in claim 2 wherein said switching means is a silicon controlled rectifier, said connection of said fourth resistor between said negative lead and said switching means being connected to the gate of said silicon controlled rectifier.

4. An overvoltage trip circuit as set forth in claim 3 wherein said silicon controlled rectifier is connected in shunt with said shunt regulator.

5. An overvoltage trip circuit as set forth in claim 1 further comprising a zener diode, said zener diode being connected in series with said shunt connection of said first and second resistor, the cathode of said zener diode being connected between the negative voltage lead of said voltage regulator and said second resistor.